(12) United States Patent
Placko et al.

(10) Patent No.: US 11,615,220 B2
(45) Date of Patent: Mar. 28, 2023

(54) METHOD FOR SIMULATING FORCES APPLIED TO A WING IN A FLUID FLOW

(71) Applicants: CENTRE NATIONAL DE LA RECHERCHE SCIENTIFIQUE, Paris (FR); ECOLE NORMALE SUPÉRIEURE PARIS-SACLAY, Cachan (FR); FLIGHT TRAINING SOLUTIONS CONSULTING, Noisy le Grand (FR)

(72) Inventors: Dominique Placko, Creteil (FR); Alain Rivollet, Jouy en Josas (FR); Serge Gourlaouen, Noisy le Grand (FR)

(73) Assignees: CENTRE NATIONAL DE LA RECHERCHE SCIENTIFIQUE, Paris (FR); ECOLE NORMALE SUPERIEURE PARIS-SACLAY, Cachan (FR); FLIGHT TRAINING SOLUTIONS CONSULTING, Noisy le Grand (FR)

( * ) Notice: Subject to any disclaimer, the term of this patent is extended or adjusted under 35 U.S.C. 154(b) by 777 days.

(21) Appl. No.: 16/475,976

(22) PCT Filed: Jan. 4, 2018

(86) PCT No.: PCT/EP2018/050214
§ 371 (c)(1),
(2) Date: Jul. 3, 2019

(87) PCT Pub. No.: WO2018/127538
PCT Pub. Date: Jul. 12, 2018

(65) Prior Publication Data
US 2019/0354657 A1 Nov. 21, 2019

(30) Foreign Application Priority Data

Jan. 6, 2017 (FR) .................................... 1750153

(51) Int. Cl.
*G06F 30/15* (2020.01)
*G06F 30/23* (2020.01)
*G06F 113/28* (2020.01)

(52) U.S. Cl.
CPC .............. *G06F 30/15* (2020.01); *G06F 30/23* (2020.01); *G06F 2113/28* (2020.01)

(58) Field of Classification Search
CPC ...... G06F 30/15; G06F 30/23; G06F 2113/28; G06F 30/20
See application file for complete search history.

(56) References Cited

U.S. PATENT DOCUMENTS

2010/0010781 A1   1/2010 Placko et al.
2010/0280802 A1  11/2010 Calmels
(Continued)

FOREIGN PATENT DOCUMENTS

WO   WO-2015177364 A1 * 11/2015 ............ G01M 9/065

OTHER PUBLICATIONS

French Search Report from French Patent Application No. 1750153, dated Oct. 20, 2017.
(Continued)

*Primary Examiner* — Rehana Perveen
*Assistant Examiner* — Cuong V Luu
(74) *Attorney, Agent, or Firm* — Greer, Burns & Crain, Ltd

(57) ABSTRACT

A method implemented by a computer for the real-time simulation of a force and/or of a moment applied to a wing in a fluid flow, wherein the body is previously modelled by at least two scalar and vector point sources of a velocity field, the method including at least one of the steps: assessing at least one element selected among a force and a moment, through a linear function dependent on the main velocity vector, V, of the flow; at least one flow rate, referred
(Continued)

to as the scalar mass flow rate, As; and at least one flow rate, referred to as the vector mass flow rate, AR, associated with the sources, on at least one point corresponding to one of the sources.

15 Claims, 7 Drawing Sheets

(56) References Cited

U.S. PATENT DOCUMENTS

2017/0103151 A1* 4/2017 Snider, Sr. .............. G06F 30/23
2017/0199097 A1* 7/2017 Placko .................. G01M 9/065

OTHER PUBLICATIONS

International Search Report from International Patent Application No. PCT/EP2018/050214, dated Apr. 11, 2018.
Banerjee et al., "Ultrasonic Field Modeling in Plates Immersed in Fluid", International Journal of Solids and Structures (2007), 44(18-19), pp. 6013-6029.
Liébeaux et al.,"The DPSM Method and its Application to NDE Problems with Interfaces Modelling", The European Physical Journal Applied Physics (2007), 38(3), pp. 283-286.

* cited by examiner

METHOD FOR SIMULATING FORCES APPLIED TO A WING IN A FLUID FLOW

BACKGROUND

The invention relates to a method implemented by a computer for real-time simulation of a force and/or a moment, applied to a body or to a wing in a fluid flow, and more particularly such a method implemented in a flight simulator. It also relates to a method for modelling such a force and/or such a moment.

By "wing" is meant the entirety of a flying system comprising both the symmetrical lateral parts and also the body of the flying system, i.e. the aircraft in the aerodynamic sense.

A flight simulator makes it possible to train pilots in flight on a particular type of aircraft, limiting the need for training on a real aircraft. It can also allow investigation of specific situations in the flight of the type of aircraft simulated. Typically, such a simulation method comprises the following steps:

acquisition: data transmitted by a pilot are captured and for example converted into digital data;

calculation: a processor can calculate spatial parameters of the wing in flight, updated as a function of the different parameters acquired;

display of the results: data originating from the calculation are transmitted to the pilot. These indications can for example consist of displaying the representation of the flight space by means of screens or producing a force feedback in a control instrument.

The latency between the action of the driver and the result in the reproduction of perceptual stimuli can introduce discomfort (simulator sickness), or more simply degrade the quality of the simulation, if it is too different to what is experienced while piloting a real aircraft. The latency recommended by the Federal Aviation Administration, in the case of flight simulators, is less than 150 ms (Federal Aviation Administration, 1991. Airplane simulator qualifications. Advisory Circular AC 120-40B). This condition is fulfilled by the most highly developed simulators in the state of the art. When the duration of the acquisition and indication steps are taken into account, this latency restricts the calculation time to less than 10 ms, preferentially less than 6 ms, for calculations associated with the flight commands and the calculations of the aerodynamics of the wing.

Typically, flight simulators use systems comprising data pointers, stored in tables, so as to respect the maximum calculation time: data from the wings, for example the drag force or lift coefficient, are listed in tables as a function of flight parameters such as the angle of incidence of the wing, the Mach number, the distance to the ground, the slat and flap configuration of the aircraft. A linear interpolation can be carried out between these separate data in order to estimate a coefficient of the wing in a precise spatial configuration. The use of data pointers allows quick calculation. Moreover, certain wing configurations cannot be calculated realistically using this method. During landing, the ground effect results in a major modification of the flows around a wing: this effect is introduced into a simulation according to the state of the art by empirical values and can prove inaccurate or imprecise and/or impossible to calculate for certain attitudes of the wing simulated. Other modifications of the flows around a wing cannot be simulated by data pointers, for example separation of the boundary layer and/or a particular wind shear or squall, which could lead to a stall.

A method making it possible to resolve this technical problem could consist of carrying out digital simulations of the fluid flows around the simulated wing, so as to calculate the forces applied to the wing as a function of the flight parameters. Different methods exist for calculating the fluid flows. Among them, the calculations using the finite element method make it possible to calculate accurately the forces exerted on a wing. A mesh of the space and calculations in each of the grid cells of the space is necessary: this type of calculation converges in a characteristic time of around ten minutes to around ten hours. A semi-analytical method was developed by some of the inventors: the distributed point source method or DPSM, described in patent applications WO2015177364 and WO2007071735, makes it possible to reduce the mesh in the space to a mesh of an interface. However, this method requires a mesh and calculations on at least several thousands of points, and does not make it possible to respect the time constraint imposed by the flight simulator standards.

The invention aims to overcome at least one of the aforementioned drawbacks of the prior art.

SUMMARY

A subject of the invention making it possible to achieve this aim, partially or totally, is a method implemented by a computer for real-time simulation of at least one element chosen from a force and a moment, applied to a body defined by a volume in a fluid flow having a main velocity vector representing the velocity of said flow at infinity, in which said body is modelled beforehand by at least two point sources of a velocity field, including at least one scalar source, generating a radial velocity field and associated with a scalar mass flow rate $\lambda_S$, and at least one vector source, generating a solenoidal velocity field, associated with a vector mass flow rate $\lambda_R$, said sources being arranged inside said volume, said method comprising at least one of the steps consisting of:

(a) simulating a superposition of the contributions of the fluid flows at least of one main velocity flow, of one said scalar source associated with a scalar mass flow rate $\lambda_S$ and of one said vector source associated with a vector mass flow rate $\lambda_R$, and (b) evaluating at least one element chosen from a force and a moment, by a linear function dependent on said main velocity vector, of at least one said scalar mass flow rate $\lambda_S$ and of at least one said vector mass flow rate $\lambda_R$, at at least one point corresponding to one said source.

According to particular embodiments of such a method:

Said simulation can be a far-field simulation.

Said body can be modelled by fewer than one hundred of said sources.

Two of said scalar sources can be arranged so as to form a dipole. In this case, the scalar mass flow rates $\lambda_S$ associated with the two said sources forming said dipole can be strictly different and have opposite signs.

At least two contrarotating vector sources can be arranged inside a volume defining said body, of which said associated vector mass flow rate $\lambda_R$ have opposite directions. In this case, the vector mass flow rates can be oriented parallel to said direction of a main velocity vector, the two said sources forming a direction normal to the direction of said main velocity vector.

Said body can be a wing.

Sources can be arranged along a line corresponding to a simple wing.

At least one element representative of the environment of the body can be modelled beforehand by at least one element chosen from a scalar external source associated with an external scalar mass flow rate $\lambda_S'$ and from one said vector external source associated with an external vector mass flow rate $\lambda_R'$, in which case:

the contributions of the fluid flows of each of said sources are also superposed during said step (a) and in said step (b) said analytic linear function is evaluated also as a function of at least one said external mass flow rate $\lambda_S'$ and of at least one external vector mass flow rate $\lambda_R'$.

In this case, moreover, said body can be close to the ground, said ground coinciding locally with a plane, said sources being arranged beforehand in a first half-space formed by said plane;

at least one mirror scalar external source associated with a mirror external scalar mass flow rate $\lambda_S'$ and at least one said mirror vector external source associated with a mirror external vector mass flow rate $\lambda_R'$ can be arranged in the other half-space formed by said plane, in which case:

the contributions of the fluid flows of said sources are also superposed during said step (a) and in said step (b) said analytic linear function is evaluated also as a function of at least one said mirror external mass flow rate $\lambda_S'$ and of at least one said mirror external vector mass flow rate $\lambda_R'$.

Another subject of the invention is a computer program product stored on a recording medium suitable for implementing such a method.

Yet another subject of the invention is a recording medium on which such a program is stored.

Yet another subject of the invention is a flight simulator characterized in that it comprises at least one calculator configured in order to receive at least first data acquired by a user, a memory containing second data representative of the fluid flow around said body, and in that said calculator is configured in order to implement such a method.

Yet another subject of the invention is a method for the construction of a model body in a fluid flow having at least one main velocity vector representing the velocity at infinity, said body being associated with at least two aerodynamic parameters chosen from a drag force coefficient, a lift coefficient, a roll coefficient, a pitch coefficient and a yaw coefficient, each coefficient being determined in one or more known spatial configurations of said body, in said fluid flow, said method comprising at least the steps consisting of:

(a) arranging in the simulated space at least two fluid point sources, including at least one fluid scalar source, associated with an unknown scalar mass flow rate $\lambda_S$, and at least one fluid vector source, associated with an unknown vector mass flow rate $\lambda_R$, said sources being arranged inside said volume defined by said body and (b) determining the value of each said scalar mass flow rate $\lambda_S$ and each said vector mass flow rate $\lambda_R$ as a function of a part of the boundary conditions imposed by at least one main velocity vector and as a function of at least one said aerodynamic parameter.

Advantageously, it is possible to determine in said step (b) the value of each said scalar mass flow rate $\lambda_S$ and each said vector mass flow rate $\lambda_R$ by the distributed point source method.

DESCRIPTION OF THE DRAWINGS

The invention will be better understood, and other advantages, details and characteristics thereof will become apparent during the following explanatory description, given by way of example with reference to the attached drawings in which.

DETAILED DESCRIPTION

Figure 1:
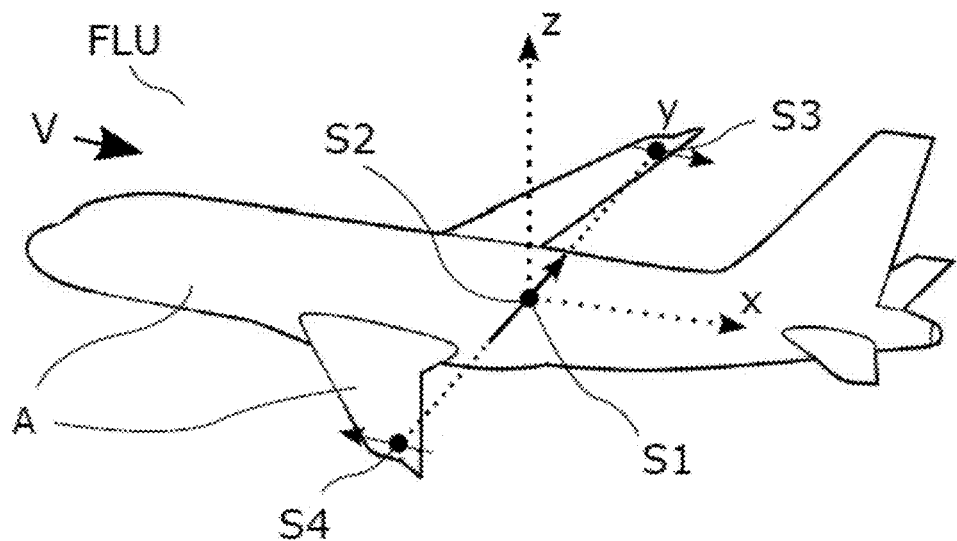
FIG. 1 shows the arrangement in space of sources S according to the invention.

The invention comprises a step of calculation resolution by the distributed point source method or DPSM, described in patent applications WO2015177364 and WO2007071735. As a preliminary, this method requires knowledge of the equations governing the development of physical variables in the different simulated environments and their particular solution in the case of a point source (Green's function). The principle thereof can be compared to methods of the integral boundary type, singularity methods, or other boundary element methods (BEM). This method only requires meshing of the surfaces or of the physical interfaces between the objects of the simulation. The DPSM method is based on a spatial distribution of point sources, arranged on either side of active surfaces of the objects of the simulation. This semi-analytical calculation method relies on a superposition of emission (or "luminous") points called sources, the weights of which, called associated values, are determined so as to satisfy the set of conditions at the boundaries of a problem. The principle consists of substituting for the objects present in the system, layers or surfaces comprising point sources situated on either side of an interface. The arrangement of the sources is associated with a mesh of test points situated on the interfaces. These sources are intended to substitute for the physical variables (fields, potential, pressure etc.) present in the simulation object and are calculated so as to verify the boundary conditions on the test points distributed over interfaces.

The DPSM method uses the equality $C = M_i \cdot \lambda$, in which C is a vector comprising the boundary conditions of the domain of a simulation. $M_i$ is an intercoupling matrix between sources S and test points, the test points being arranged in a mesh at the interfaces, and the sources S arranged on either side of the test points representing interfaces in prior art embodiments. λ is a vector of the values associated with the sources, unknown at the time of construction of a model. In all of the embodiments of the invention, the elements of λ are mass flow rates. The matrix $M_i$ can be inverted so as to determine λ. The value of a physical variable simulated at a point P of the space, or of the spatial domain of simulation, is calculated or evaluated by using the product $M_p \cdot \lambda$ ($M_p$ in this case representing an observation matrix).

The inventors discovered that it is possible to use a part of this method so as to evaluate or simulate forces or moments applied to a wing:
- by calculating macroscopic variables. It is possible to use jointly, integral formulations such as the rotational theorem (Stokes' theorem) and/or the divergence theorem (Green-Ostrogradski theorem). In the embodiments of the invention, these integral equations are used in order to calculate forces or moments;
- by expressing forces or moments under far-field hypotheses. These hypotheses make it possible not to produce a mesh of the objects of the simulation, but to use representative points, as one or more barycentres. In this way, it is possible to calculate forces by using fewer than 100 sources S and preferentially fewer than 10 sources S, while a mesh produced in the prior art requires at least more than one thousand sources S, making the calculation more complex and extending the calculation processing time.

FIG. 1 shows the arrangement in space of sources S according to the invention. In particular, FIG. 1 corresponds to the case in which a body C corresponds to a wing A. Generally, the different embodiments described can be implemented equally well for a body C or a wing A. In embodiments of the invention, a model is constructed of a wing A (or aircraft) in a fluid flow FLU. The fluid flow FLU is described at least by a main velocity vector V, shown by a bold arrow in FIG. 1. In embodiments of the invention, several vectors V can be considered: V can be different for each of the sources.

The body C or the wing A can be described by a volume. This volume is for example defined by the interface between the wing A and the fluid flow FLU.

By "scalar source S" is meant a point source S resulting in a radial velocity field. Each scalar source is associated with a scalar mass flow rate $\lambda_S$. In embodiments of the invention, the dimension of the scalar mass flow rate $\lambda_S$ associated with a source S is homogenous at a mass flow rate, expressed in kg·s$^{-1}$.

By "vector source S" is meant a point source S resulting in a solenoidal zero divergence velocity field. Each vector source is associated with a vector mass flow rate $\lambda_R$. In embodiments of the invention, the dimension of a vector mass flow rate $\lambda_R$ is homogenous at a mass flow rate, expressed in kg·s$^{-1}$.

By "far-field simulation" or "simulation produced in far-field" is meant a simulation proceeding to a phenomenological decomposition of the drag and/or the lift of a body C or of a wing A to be evaluated, as opposed to a "near-field simulation" corresponding to an evaluation of a drag and/or of a lift by integration of forces of pressure and/or of friction at the interface defining the volume of said body C or of said wing A.

In FIG. 1, a set of four point sources S (S1, S2, S3 and S4) is arranged inside the volume defined by the wing A. Generally, at least two sources S can be arranged inside the volume defined by the wing A. In FIG. 1, two sources S are arranged at the centre of the wing A: the source S1 which is a scalar source S associated with an unknown scalar mass flow rate $\lambda_S$ and the source S2, which is a vector source, associated with an unknown vector mass flow rate $\lambda_R$.

Generally, at least two sources S are arranged inside the volume, including a source S called scalar source and a source S called vector source. Two other sources are shown in FIG. 1; S3 and S4 are sources arranged at two ends of the wing A. S3 and S4 are contrarotating vector sources S, i.e. the vector mass flow rates $\lambda_R$ that are respectively associated therewith have opposite directions. In the invention, the vector mass flow rates $\lambda_R$ associated with the sources S3 and S4 can be oriented parallel to the direction of the main velocity vector V, the two sources S forming a direction normal to the direction of the main velocity vector V. The advantages of a modelling shown in FIG. 1 are described hereinafter.

Figure 2:
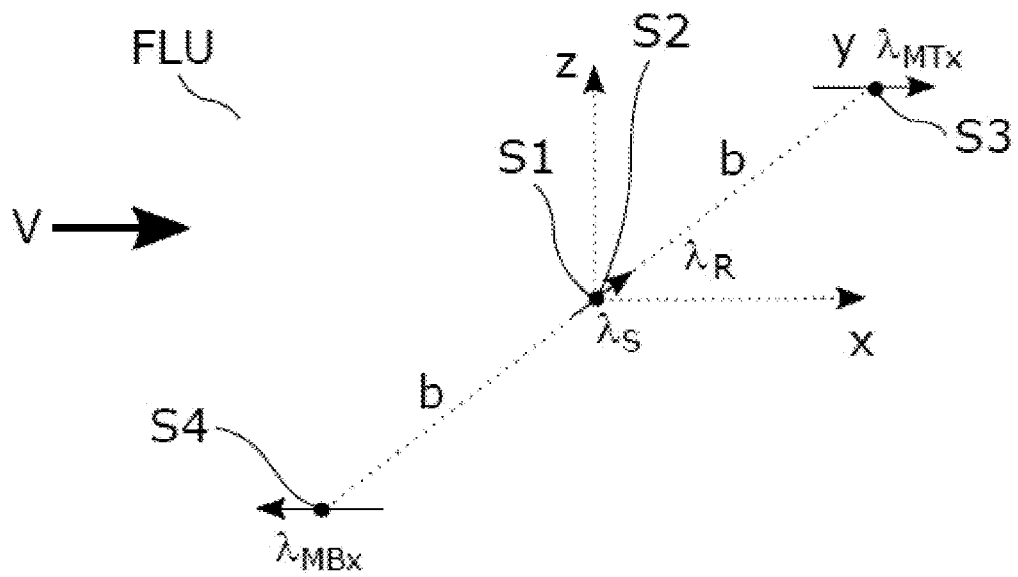
FIG. 2 shows a method for the construction of a model according to an embodiment of the invention.

FIG. 2 shows a method for the construction of a model according to an embodiment of the invention. Generally, during the construction of a model according to the invention, the body C or the wing A is associated with at least two aerodynamic parameters. These parameters can be chosen from a drag force coefficient, a lift coefficient, a roll coefficient, a pitch coefficient and a yaw coefficient. These coefficients correspond to parameters of the wing A determined in the state of the art for known spatial and aerodynamic configurations of the wing A, for example determined experimentally beforehand, in a known fluid flow FLU. These parameters can correspond to parameters of the nomographs used by the nomograph pointers in the embodiments of the prior art.

The sources S (S1, S2, S3, and S4) shown in FIG. 2 correspond to the four sources shown in FIG. 1: the modelling comprises two sources S1 and S2 arranged at the centre (S1 being a scalar source S, associated with the scalar mass flow rate $\lambda_S$ and S2 being a vector source S, associated with the vector mass flow rate $\lambda_{Ry}$. The modelling also comprises two other vector sources S, called boundary sources, S3 and S4. In the embodiments of the invention, the sources S3 and S4 are contrarotating and are respectively associated with the vector mass flow rates $\lambda_{MTx}$ and $\lambda_{MBx}$. The source S3 (called starboard rotational boundary source) and the source S4 (called port rotational boundary source) are arranged on either side of the sources S1 and S2, at a distance b from the sources S1 and S2 (2.b corresponding to the span of the wing A). In the case shown in FIG. 2, the directions of the vector sources S3 and S4 are normal to the main velocity vector V shown. This condition is for example not verified in a modelling in which a wind component is a crosswind.

Generally, for a wing A with surface area S, having a drag force coefficient $C_x$ and range coefficient $C_z$, it is possible to derive the following lift force $F_Z$ and the drag force $F_X$:

$$F_z = \tfrac{1}{2} \rho \cdot V^2 \cdot S \cdot C_z \text{ and} \qquad (1)$$

$$F_X = \tfrac{1}{2} \rho \cdot V^2 \cdot S \cdot C_X. \qquad (2)$$

where ρ is the mass density of the fluid FLU in Kg·m$^{-3}$. The vector mass flow rate $\lambda_R$ can be written in the form $\lambda_R = \rho \cdot (\omega \cdot dS) \cdot dl$, ω being the vorticity in s$^{-1}$ and dl a vector length element.

By analogy with electromagnetic forces, the lift force $F_Z$ and the drag force $F_X$ can be expressed as follows:

$$F_Z = V \wedge \lambda_R \qquad (3)$$

$$F_X = V \cdot \lambda_S \qquad (4)$$

The equation (3), corresponding to the source S2, can be written in matrix form:

$$\vec{F} = \begin{pmatrix} f_x \\ f_y \\ f_z \end{pmatrix} = \begin{pmatrix} v_y \cdot \lambda_{Rz} - v_z \cdot \lambda_{Ry} \\ v_z \cdot \lambda_{Rx} - v_x \cdot \lambda_{Rz} \\ v_x \cdot \lambda_{Ry} - v_y \cdot \lambda_{Rx} \end{pmatrix} = \begin{pmatrix} 0 & -v_z & +v_y \\ +v_z & 0 & -v_x \\ -v_y & +v_x & 0 \end{pmatrix} \cdot \begin{pmatrix} \lambda_{Rx} \\ \lambda_{Ry} \\ \lambda_{Rz} \end{pmatrix} \quad (5)$$

In the modelling shown in FIG. 2, the main velocity vector V is orientated along the axis x shown, such that $V_y = V_z = 0$. In the example shown, non-limitatively, the vector mass flow rate associated with S2 is oriented along y, the components along x and z being zero. In this case:

$$\begin{pmatrix} f_x \\ f_y \\ f_z \end{pmatrix} = \begin{pmatrix} 0 & 0 & 0 \\ 0 & 0 & -v_x \\ 0 & +v_x & 0 \end{pmatrix} \cdot \begin{pmatrix} 0 \\ \lambda_{Ry} \\ 0 \end{pmatrix} = \begin{pmatrix} 0 \\ 0 \\ v_x \lambda_{Ry} \end{pmatrix} \quad (6)$$

The lift force in the equation (6) is reduced to $f_z = v_x \cdot \lambda_{Ry}$.

The equation (4), corresponding to the source S1, can be written in matrix form:

$$\vec{F} = \begin{pmatrix} f_x \\ f_y \\ f_z \end{pmatrix} = \begin{pmatrix} v_x \\ v_y \\ v_z \end{pmatrix} \cdot \lambda_S = \begin{pmatrix} v_x \cdot \lambda_S \\ v_y \cdot \lambda_S \\ v_z \cdot \lambda_S \end{pmatrix} = \begin{pmatrix} v_x & 0 & 0 \\ 0 & v_y & 0 \\ 0 & 0 & v_z \end{pmatrix} \cdot \begin{pmatrix} \lambda_S \\ \lambda_S \\ \lambda_S \end{pmatrix} \quad (7)$$

The drag force can be reduced in this modelling example to $f_x = v_x \cdot \lambda_S$: the force F has a single x (drag force) component oriented along x if V has only one component along x.

The preceding equations show that, considering the sources S1 and S2, it is possible to model forces parallel and/or normal to the fluid flow FLU having main velocity vector V by using respectively the properties of the scalar and rotational sources S. The resulting force applied at the point corresponding to S1 and S2, associated with $\{\lambda_{Rr}, \lambda_{Ry}, \lambda_{Rx}, \lambda_S\}$ is:

$$\vec{F} = \begin{pmatrix} 0 & -v_z & +v_y \\ +v_z & 0 & -v_x \\ -v_y & +v_x & 0 \end{pmatrix} \begin{pmatrix} \lambda_{Rx} \\ \lambda_{Ry} \\ \lambda_{Rz} \end{pmatrix} + \begin{pmatrix} v_x & 0 & 0 \\ 0 & v_y & 0 \\ 0 & 0 & v_z \end{pmatrix} \begin{pmatrix} \lambda_S \\ \lambda_S \\ \lambda_S \end{pmatrix} \quad (8)$$

i.e.:

$$\vec{F} = \begin{pmatrix} \lambda_S & \lambda_{Rz} & -\lambda_{Ry} \\ -\lambda_{Rz} & \lambda_S & \lambda_{Rx} \\ \lambda_{Ry} & -\lambda_{Rx} & \lambda_S \end{pmatrix} \cdot \begin{pmatrix} v_x \\ v_y \\ v_z \end{pmatrix} \quad (9)$$

It is also possible to derive the analytical expression of the velocities created by a scalar source S (isotropic. Green's function) associated with a scalar mass flow rate $\lambda_S$. For example a scalar source S is considered, with coordinate $r_0$, radiating at a coordinate point r. The relative coordinate R thereof can be defined as follows:

$$\vec{R} = \vec{r} - \vec{r}_0 = \begin{pmatrix} x - x_0 \\ y - y_0 \\ z - z_0 \end{pmatrix} = \begin{pmatrix} r_x \\ r_y \\ r_z \end{pmatrix} \quad (14)$$

with:

$$R = (r_x^2 + r_y^2 + r_z^2)^{\frac{1}{2}} \quad (15)$$

The velocity radiated at the coordinate point r is then given by:

$$\vec{V} = \begin{pmatrix} v_x \\ v_y \\ v_z \end{pmatrix} = \frac{1}{4 \cdot \pi \cdot \rho \cdot R^3} \cdot \begin{pmatrix} +r_x & 0 & 0 \\ 0 & +r_y & 0 \\ 0 & 0 & +r_z \end{pmatrix} \cdot \begin{pmatrix} \lambda_S \\ \lambda_S \\ \lambda_S \end{pmatrix} \quad (16)$$

The scalar source S associated with the mass flow rate $\lambda_S$ radiates isotropically.

Similarly, it is possible to consider a vector source S with coordinate $r_0$, associated with a vector mass flow rate $\lambda_R$, and derive the expression of the velocity radiated at a coordinate point r. The equations (14) and (15) at still verified and:

$$\vec{V} = \begin{pmatrix} v_x \\ v_y \\ v_z \end{pmatrix} = \frac{\vec{\lambda}_R \wedge \vec{R}}{4 \cdot \pi \cdot R^3} = \begin{pmatrix} \lambda_{Rx} \\ \lambda_{Ry} \\ \lambda_{Rz} \end{pmatrix} \wedge \begin{pmatrix} r_x \\ r_y \\ r_z \end{pmatrix} \quad (17)$$

and therefore:

$$\vec{V} = \begin{pmatrix} v_x \\ v_y \\ v_z \end{pmatrix} = \frac{1}{4 \cdot \pi \cdot \rho \cdot R^3} \cdot \begin{pmatrix} \lambda_{Ry} \cdot r_z - \lambda_{Ry} \cdot r_y \\ \lambda_{Rz} \cdot r_x - \lambda_{Rx} \cdot r_z \\ \lambda_{Rx} \cdot r_y - \lambda_{Ry} \cdot r_x \end{pmatrix} \quad (18)$$

If $r_0$ is the coordinate of a first vector source S with respect to a second vector source, the first vector source radiates the following velocity on the second vector source:

$$\vec{V} = \begin{pmatrix} v_x \\ v_y \\ v_z \end{pmatrix} = \frac{1}{4 \cdot \pi \cdot \rho \cdot R^3} \cdot \begin{pmatrix} 0 & +r_z & -r_y \\ -r_z & 0 & +r_x \\ +r_y & -r_x & 0 \end{pmatrix} \cdot \begin{pmatrix} \lambda_{Rx} \\ \lambda_{Ry} \\ \lambda_{Rz} \end{pmatrix} \quad (19)$$

and radiates the following force:

$$\vec{F} = \begin{pmatrix} f_x \\ f_y \\ f_z \end{pmatrix} = \begin{pmatrix} 0 & +\lambda_{R2z} & -\lambda_{R2y} \\ -\lambda_{R2z} & 0 & +\lambda_{R2x} \\ +\lambda_{R2y} & -\lambda_{R2x} & 0 \end{pmatrix} \cdot \begin{pmatrix} v_x \\ v_y \\ v_z \end{pmatrix} \quad (20)$$

In the case where $\lambda_R$ only comprises one x component (the case corresponding physically to wingtip vortices, shown by S3 and S4 in FIG. 1), the first source S results in a force, at the point of sources S1 and S2, at the centre of the wing, comprising only a single z component.

In the case of the starboard wingtip vortex, (corresponding to the source S3) $\lambda_{Rx}$ is positive, $r_y$ is negative, and $V_z$ is negative.

In the case of the port wingtip vortex, (corresponding to the source S4) $\lambda_{Rx}$ is negative, $r_y$ is positive, and $V_z$ is negative.

The velocity induced by the vector source S3 on the torque of sources S1 and S2 is therefore:

$$v_z = -\frac{1}{4 \cdot \pi \cdot \rho \cdot b^2} \cdot \lambda_{MTx} \quad (21)$$

Similarly, the velocity induced by the source S4 on the torque of sources S1 and S2 is:

$$v_z = +\frac{1}{4\cdot\pi\cdot\rho\cdot b^2}\cdot\lambda_{MBx} \quad (22)$$

The different components of the forces induced by the sources S3 and S4 on S1 can be deduced therefrom:

$$\vec{F}_z = -\frac{\lambda_S}{4\cdot\pi\cdot\rho\cdot b^2}\cdot(\lambda_{MTx}-\lambda_{MBx}) \quad (23)$$

and on S2:

$$\vec{F}_x = +\frac{\lambda_{Ry}}{4\cdot\pi\cdot\rho\cdot b^2}\cdot(\lambda_{MTx}-\lambda_{MBx}) \quad (24)$$

The mass flow rates associated with the different sources are proportional to the velocity:

$$\lambda_{Ry}=k_{Ry}\cdot V \quad (25)$$

$$\lambda_S=k_S\cdot V \quad (26)$$

$$\lambda_{MTx}=k_{MTx}\cdot V \quad (27)$$

$$\lambda_{MBx}=k_{MBx}\cdot V \quad (28)$$

Symmetrical flight of the wing A results in the condition:

$$k_{MBx}=-k_{MTx} \quad (29)$$

Preservation of the vorticity results in:

$$k_{MTx}=k_{Ry}=-k_{MBx} \quad (30)$$

The lift can then be written in the two following ways:

$$\vec{F}_z = k_{Ry}\cdot V_x^2 - \frac{k_S}{4\cdot\pi\cdot\rho\cdot b^2}\cdot(2\cdot k_{MTx})\cdot V_x^2 = \frac{1}{2}\cdot\rho\cdot V_x^2\cdot S\cdot C_z \quad (31)$$

Similarly, the drag force can be written in the two following ways:

$$\vec{F}_x = k_S\cdot V_x^2 - \frac{k_{Ry}}{4\cdot\pi\cdot\rho\cdot b^2}\cdot(2\cdot k_{MTx})\cdot V_x^2 = \frac{1}{2}\cdot\rho\cdot V_x^2\cdot S\cdot C_x \quad (32)$$

In the model shown, the sources S3 and S4, modelling the wingtip vortices, result in a reduction in the lift (induced incidence effect) and an increase in the drag force (induced drag force effect). In the absence of the sources S3 and S4, the terms corresponding to a typical lift and an atypical drag force would be found.

With the following notation:

$$B=4\cdot\pi\cdot\rho\cdot b^2 \text{ and} \quad (33)$$

$$A=\tfrac{1}{2}\cdot\rho\cdot S \quad (34)$$

The expressions for the lift and drag force can be written respectively as follows:

$$\vec{F}_z = k_{Ry}\cdot\left[1-\frac{k_S}{B}\cdot(2)\right]\cdot V_x^2 = A\cdot V_x^2\cdot C_z \text{ and} \quad (35)$$

$$\vec{F}_x = 1\cdot\left[k_S-\frac{k_{Ry}^2}{B}\cdot(2)\right]\cdot V_x^2 = A\cdot V_x^2\cdot C_x. \quad (36)$$

The lift and drag force coefficients can then be expressed as follows:

$$C_z = \frac{1}{A}\cdot k_{Ry}\cdot\left[1-2\cdot\frac{k_S}{B}\right] \text{ and} \quad (37)$$

$$C_x = \frac{1}{A}\cdot\left[k_S+2\cdot\frac{k_{Ry}^2}{B}\right] \quad (38)$$

and therefore the expression of $k_{Ry}$:

$$k_{Ry} = \frac{A\cdot C_z}{[1-2\cdot k_S/B]} \quad (39)$$

The expression for the drag force coefficient becomes:

$$C_x = \frac{1}{A}\cdot\left[k_S+\frac{2\cdot A^2\cdot C_z^2}{B\cdot(1-2\cdot k_S/B)^2}\right] \quad (40)$$

It is possible to solve the equation (40) numerically so as to identify $k_s$ and subsequently the different values for the other mass flow rates associated with the other sources of the model. Generally, a step of a method according to the invention consists of determining the value of each scalar mass flow rate $\lambda_S$ and of each vector mass flow rate $\lambda_R$ as a function of a part, or the totality, of the boundary conditions imposed by at least one main velocity vector V and of at least one aerodynamic parameter, such as the drag force coefficient and the lift coefficient in the example shown in FIG. 2, in a given configuration. Advantageously, the values of each scalar mass flow rate $\lambda_S$ and of each vector mass flow rate $\lambda_R$ can be determined within the general framework of a resolution according to the distributed point source method (DPSM).

By simplifying the equation (40) to the first order, it is possible to write:

$$C_x = \frac{k_S}{A}+\frac{2\cdot A\cdot C_z^2}{B} = \frac{k_S}{A}+\frac{2\cdot\left(\tfrac{1}{2}\cdot\rho\cdot S\right)\cdot C_z^2}{4\cdot\pi\cdot\rho\cdot b^2} \quad (41)$$

and therefore:

$$C_x = \frac{k_S}{A}+\frac{S\cdot C_z^2}{4\cdot\pi\cdot b^2} = \frac{k_S}{A}+\frac{C_z^2}{\pi\cdot(4\cdot b^2/S)} \quad (42)$$

The aspect ratio All is defined by the ratio of the span to the chord of a wing A, i.e. in the model shown in FIG. 2:

$$All=(2\cdot b)/(S/2\cdot b)=4\cdot b^2/S \quad (43)$$

The equation (42) becomes:

$$C_x = \frac{k_S}{A}+\frac{C_z^2}{\pi\cdot(4\cdot b^2/S)} = Cx_0+\frac{C_z^2}{\pi\cdot(All)} \quad (44)$$

The equation (44) makes it possible to identify a term similar to the induced drag force of Prandtl's theory, added to $C_{x0}$.

Similarly, it is possible to express $C_x$ as a function of $C_z$:

$$C_x = \frac{1}{A}\cdot\left[k_S+2\cdot\frac{k_{Ry}^2}{B}\right] \quad (45)$$

-continued $$C_z = \frac{1}{A} \cdot k_{Ry} \cdot \left[1 - 2 \cdot \frac{k_S}{B}\right] \quad (46)$$

$$k_S = A \cdot C_x - \frac{2 \cdot k_{Ry}^2}{B} \quad (47)$$

$$C_z = \frac{1}{A} \cdot k_{Ry} \cdot \left[1 - \frac{2 \cdot A \cdot Cx}{B} + \frac{4 \cdot k_{Ry}^2}{B^2}\right] \quad (48)$$

On the basis of a dimensional analysis, it is possible to show that:

$$4 \cdot \frac{k_{Ry}^2}{B^2} \cong \left(2 \cdot \frac{A}{B}\right)^2 \cong \left(\frac{1}{\pi \cdot A/l}\right)^2 << \left(2 \cdot \frac{A}{B}\right) \cdot Cx \quad (49)$$

It is possible to simplify the equation (48) to the first order as follows:

$$C_z = \frac{1}{A} \cdot k_{Ry} \cdot \left[1 - \frac{2 \cdot A \cdot Cx}{B}\right] = \frac{k_{Ry}}{A}\left[1 - \frac{2 \cdot \left(\frac{1}{2} \cdot \rho \cdot S\right) \cdot Cx}{4 \cdot \pi \cdot \rho \cdot b^2}\right] \quad (50)$$

i.e.:

$$C_z = \frac{k_{Ry}}{A}\left[1 - \frac{S \cdot Cx}{4 \cdot \pi \cdot b^2}\right] = \frac{k_{Ry}}{A}\left[1 - \frac{Cx}{\pi \cdot (4 \cdot b^2/S)}\right], \quad (51)$$

$$C_z = \frac{k_{Ry}}{A}\left[1 - \frac{Cx}{\pi \cdot (4 \cdot b^2/S)}\right] = C_{z0}\left[1 - \frac{Cx}{\pi \cdot A/l}\right] \quad (52)$$

It is possible to identify a corrective term in the equation (42), dependent on $C_x$, which reduces the lift $C_{z0}$.

Another embodiment of the invention is a method, implemented by a computer in real-time, for simulating at least one force F or a moment M, applied to a body C, modelled by a volume described above, and using a model the construction of which has been described above. i.e. a model in which the fluid flow FLU comprises at least one main velocity vector V representing a velocity of the flow at infinity, in which the body C is modelled beforehand by at least two point sources S of a velocity field, including at least one scalar source S, generating a radial velocity field and associated with a scalar mass flow rate $\lambda_S$, and at least one vector source S, generating a solenoidal velocity field, associated with a vector mass flow rate $\lambda_R$. It is possible to calculate, beforehand, for at least one configuration of the body C, the values of each scalar mass flow rate $\lambda_S$ and of each vector mass flow rate $\lambda_R$ as described above. An embodiment of the invention comprises at least one step consisting of:

simulating a superposition of the contributions of the fluid flows FLU of at least one main velocity flow V, of a scalar source S associated with a scalar mass flow rate $\lambda_S$ and of a vector source S associated with a vector mass flow rate $\lambda_R$, and/or evaluating at least one element chosen from a force F and a moment M, by a linear function dependent on the main velocity vector V, of at least one scalar mass flow rate $\lambda_S$ and at least one said vector mass flow rate $\lambda_R$, at at least one point corresponding to one said source S. In an embodiment in FIG. 2, this step can for example consist of calculating one of the forces, or the two forces corresponding to the equations (34) and/or (35). This embodiment of the invention makes it possible to solve at least a part of the technical problems raised: the inventors discovered that by using a method according to the invention, it is possible to simulate a force and/or a moment by evaluating a simple linear expression. This calculation can be carried out by a computer in less than 6 ms, and makes it possible to use this model in order to simulate the flight of a wing A by using the calculation power of an ordinary computer at the time of the invention. i.e. one with performance that is not exceptional at the time of the invention.

Advantageously, the simulation described above is a simulation carried out in far field.

Another embodiment of the invention is a computer program product, stored on a recording medium suitable for implementing a method described above. Another embodiment of the invention is a recording medium on which such a program is stored.

Another embodiment of the invention is a flight simulator SIM, comprising a calculator, for example incorporated in a computer, the calculator being configured in order to implement a method according to the invention described above. Such a flight simulator SIM can for example be configured in order to receive first data, acquired by a user of the simulator. A memory can comprise second data representative of the fluid flow FLU, updated in real time. These second data can also comprise values of the different mass flow rates $\lambda_S$ and $\lambda_R$, calculated beforehand by a method for the construction of the model according to the invention. They can also comprise nomographs. In this case, a simulator SIM can choose to evaluate forces applied to a wing A below a height defined beforehand for the wing A in the simulation. Below this height, these forces can be evaluated by nomograph pointers according to the prior art. In a variant, a calculator of a second computer connected to a first computer of the simulator can be responsible for the simulation of a force F or of a moment 9M sequentially with the simulation carried out according to the state of the art by the first computer.

Figure 3:
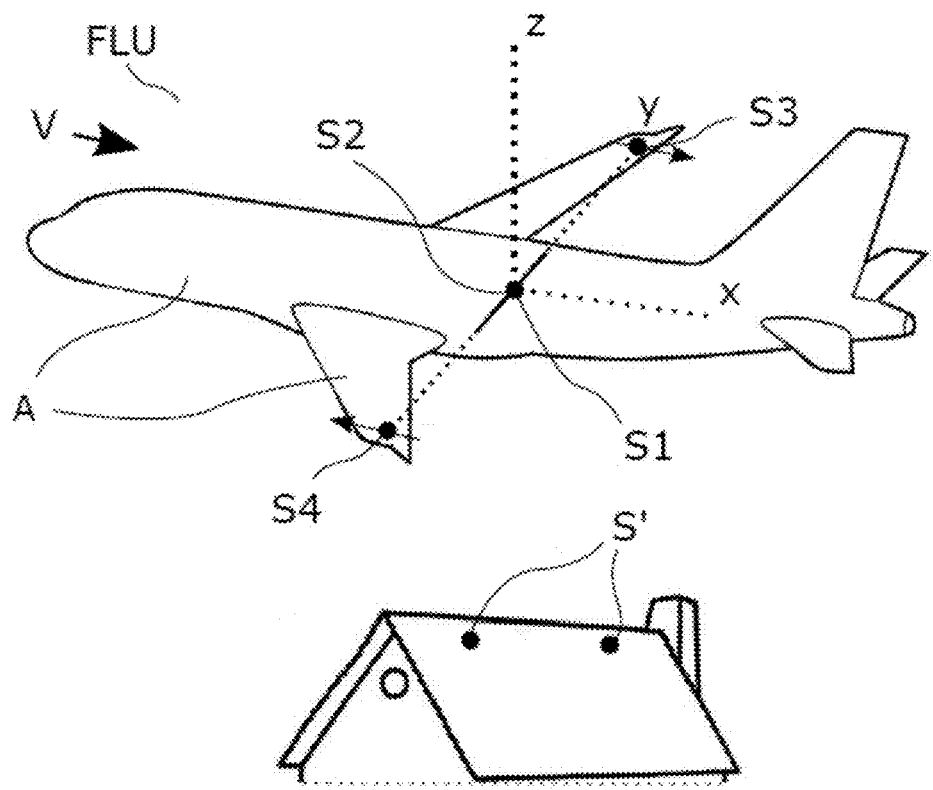
FIG. 3 shows the construction of a model according to the invention adapted to the simulation of an interaction between a wing and an external event.

FIG. 3 shows the construction of a model according to the invention adapted to a simulation of the effect of an element of the environment external to the body C or to the wing A. Generally, the inventors discovered that it was possible to model the effect of an external element on a model of an existing body C, by adding to the models described above, at least one scalar external source S', associated with a mirror scalar mass flow rate $\lambda_S'$. Advantageously, it is also possible to add at least one vector external source S', associated with a mirror vector mass flow rate $\lambda_R'$, each of the external sources S' being arranged outside the volume of the body C or of the wing A. FIG. 3 shows the construction of a model adapted to a simulation of the external effect, comprising sources S of an embodiment shown in FIG. 2, and external sources S' modelling a premises or a building. More generally, different systems of external sources S' can be arranged so as to simulate for example a naval vessel (in the case of landing at sea), buildings on land, the ground, or even particular crosswinds. In this embodiment of the invention, the contributions of the fluid flows FLU of each source S' are also superposed during step (a) of the method, and in step (b) of the method an analytic linear function is evaluated, also as a function of at least one external mass flow rate $\lambda_S'$ and/or of at least one external vector mass flow rate $\lambda_R'$. An embodiment of such a model is given in the remainder of the description, in particular in modelling the ground effect.

Figure 4:
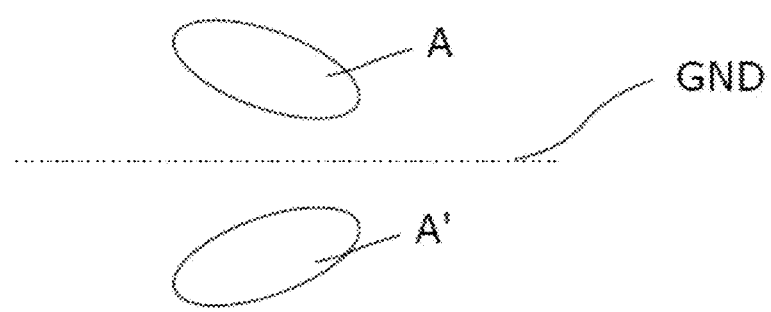
FIG. 4 shows a wing A in a configuration able to be affected by a ground effect.

FIG. 4 shows a wing A in a configuration able to be affected by a ground effect. Experimentally, this configuration modifies the lift and the drag force of a wing A, close to the ground, with respect to a configuration of the wing A at a cruising height. In FIG. 4, it is assumed that the ground coincides locally with a plane GND. The wing A is shown above the ground GND, in a first half-space a limit of which is formed by the plane GND. Conventionally, the ground effect on a wing A is simulated, experimentally or numerically, by replacing the ground GND by a mirror wing A', symmetrical with the wing A with respect to the plane GND.

Figure 5:
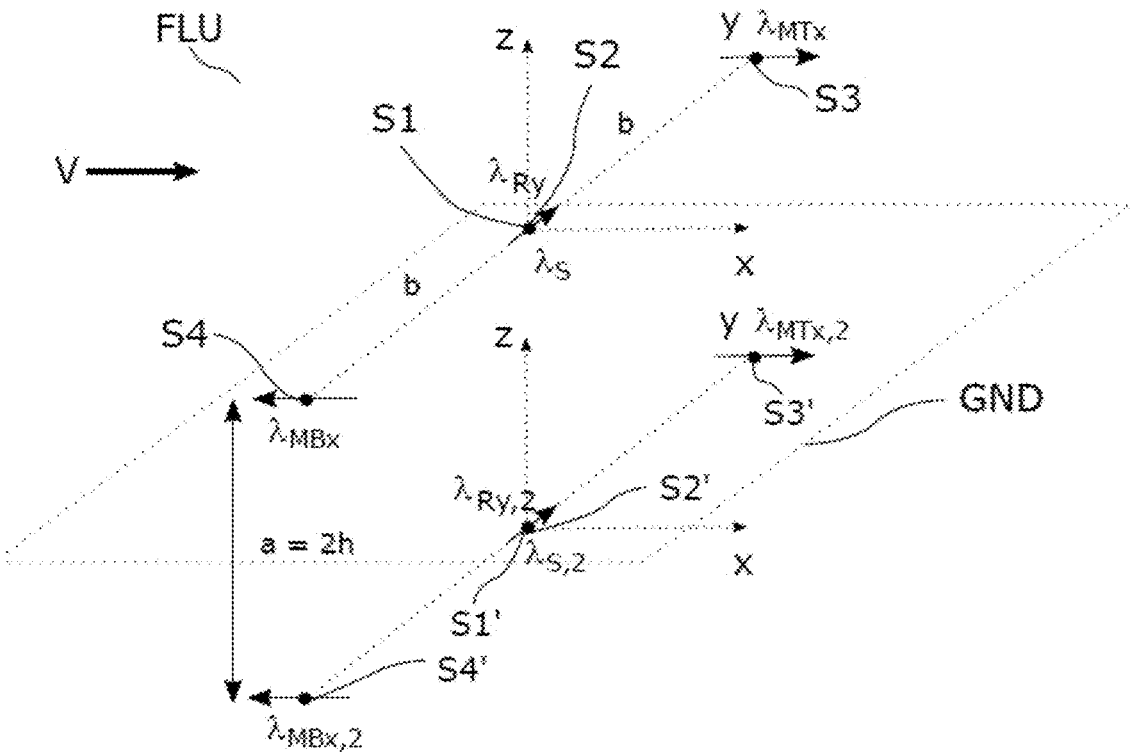
FIG. 5 shows the construction of a model according to the invention adapted to a simulation of the ground effect.

FIG. 5 shows the construction of a model according to the invention adapted to a simulation of the ground effect. Generally, the inventors discovered that it was possible to model the ground effect on a model of a wing, adding to the models described above at least one mirror scalar external source S', associated with a mirror scalar mass flow rate $\lambda_S'$ and at least one mirror vector external source S', associated with a mirror vector mass flow rate $\lambda_R'$, each of the mirror external sources S' being arranged in a second half-space defined by the plane GND and different from the first half-space, in which the sources S are arranged. FIG. 5 shows the construction of a model adapted to a simulation of the ground effect, comprising sources S of an embodiment shown in FIG. 2, and mirror external sources S' symmetrical with the sources S with respect to the plane GND, each of the sources S' being separated from the symmetrical source S with respect to the plane GND by a distance $a=2.h$.

The sources S1', S2', S3' and S4' are respectively symmetrical, with respect to the plane GND, with the sources S1, S2, S3 and S4, and are respectively associated with the mass flow rates $\lambda_{S,2}$, $\lambda_{Ry,2}$, $\lambda_{MTx,2}$ and $\lambda_{MBx,2}$. The conditions of symmetry also define:

$$\lambda_{MBx,2} = -\lambda_{MTx,2} = \lambda_{MTx} = -\lambda_{MBx} = \lambda_{Ry} \tag{53}$$

$$\lambda_{Ry,2} = -\lambda_{Ry} \text{ and} \tag{54}$$

$$\lambda_{S,2} = \lambda_S. \tag{55}$$

It is possible to calculate the influence of the model of the mirror wing A' comprising the mirror external sources S' on the forces exerted on the wing A'. In the following calculation, by "centre" is meant the point of sources S1 and S2. The vector R, with norm equal to a, between the sources S1' and S2' and S1 and S2 is defined by:

$$\vec{R} = \begin{pmatrix} r_x \\ r_y \\ r_z \end{pmatrix} = \begin{pmatrix} 0 \\ 0 \\ a \end{pmatrix} \tag{56}$$

The contribution of the vector source S2' can be expressed as follows:

$$\vec{V}_{R,Centre,2} = \begin{pmatrix} v_x \\ v_y \\ v_z \end{pmatrix} = \frac{1}{4 \cdot \pi \cdot \rho \cdot R^3} \cdot \begin{pmatrix} 0 & +r_z & -r_y \\ -r_z & 0 & +r_x \\ +r_y & -r_x & 0 \end{pmatrix} \cdot \begin{pmatrix} \lambda_{Rx,2} \\ \lambda_{Ry,2} \\ \lambda_{Rz,2} \end{pmatrix} \tag{57}$$

i.e.:

$$\vec{V}_{R,Centre,2} = \frac{1}{4 \cdot \pi \cdot \rho \cdot R^3} \cdot \begin{pmatrix} 0 & a & 0 \\ -a & 0 & 0 \\ 0 & 0 & 0 \end{pmatrix} \cdot \begin{pmatrix} 0 \\ \lambda_{Ry,2} \\ 0 \end{pmatrix} = \frac{1}{4 \cdot \pi \cdot \rho \cdot a^3} \begin{pmatrix} a \cdot \lambda_{Ry,2} \\ 0 \\ 0 \end{pmatrix} = \frac{-\lambda_{Ry}}{4 \cdot \pi \cdot \rho \cdot a^2} \vec{e_x} \tag{58}$$

The contribution of the scalar source S1' can be expressed as follows:

$$\vec{V}_{S,Centre,2} = \begin{pmatrix} v_x \\ v_y \\ v_z \end{pmatrix} = \frac{1}{4 \cdot \pi \cdot \rho \cdot R^3} \cdot \begin{pmatrix} r_x & 0 & 0 \\ 0 & r_y & 0_x \\ 0 & 0 & r_z \end{pmatrix} \cdot \begin{pmatrix} \lambda_{S,2} \\ \lambda_{S,2} \\ \lambda_{S,2} \end{pmatrix} \tag{59}$$

i.e.:

$$\vec{V}_{S,Centre,2} = \frac{1}{4 \cdot \pi \cdot \rho \cdot a^3} \cdot \begin{pmatrix} 0 & 0 & 0 \\ 0 & 0 & 0 \\ 0 & 0 & a \end{pmatrix} \begin{pmatrix} \lambda_{S,2} \\ \lambda_{S,2} \\ \lambda_{S,2} \end{pmatrix} = \begin{pmatrix} 0 \\ 0 \\ \frac{\lambda_{S,2}}{4 \cdot \pi \cdot \rho \cdot a^2} \end{pmatrix} = \frac{\lambda_S}{4 \cdot \pi \cdot \rho \cdot a^2} \vec{e_z} \tag{60}$$

The mirror external sources S3' and S4', corresponding to the image wingtip vortices, make the following contribution:

$$\vec{V}_{MT,Centre} = \begin{pmatrix} 0 \\ 0 \\ \frac{-\lambda_{MTx}}{4 \cdot \pi \cdot \rho \cdot b^2} \end{pmatrix} = \frac{-\lambda_{Ry}}{4 \cdot \pi \cdot \rho \cdot b^2} \vec{e_z} \tag{61}$$

The sum of the contributions of the sources S and the mirror external sources S' at the centre, corresponding to the source S2 can be expressed by:

$$v_x = \frac{-\lambda_{Ry}}{4 \cdot \pi \cdot \rho \cdot a^2}, \tag{62}$$

$$v_y = 0 \text{ and} \tag{63}$$

$$v_z = \frac{\lambda_{Ry}}{4 \cdot \pi \cdot \rho} \left( \frac{-2}{b^2} + \frac{2 \cdot b}{\sqrt{a^2 + b^2}^3} \right) + \frac{\lambda_S}{4 \cdot \pi \cdot \rho \cdot a^2} \tag{64}$$

It is possible to calculate the forces linked to the velocities induced on the source S1 on the basis of the equation (7):

$$F_x = \frac{-\lambda_S \cdot \lambda_{Ry}}{4 \cdot \pi \cdot \rho \cdot a^2}, \tag{65}$$

$$F_y = 0 \text{ and} \tag{66}$$

$$F_z = \frac{\lambda_S \cdot \lambda_{Ry}}{4 \cdot \pi \cdot \rho} \left( \frac{-2}{b^2} + \frac{2 \cdot b}{\sqrt{a^2 + b^2}^3} \right) + \frac{\lambda_S \cdot \lambda_S}{4 \cdot \pi \cdot \rho \cdot a^2} \tag{67}$$

Similarly, it is possible to calculate the forces linked to the velocities induced on the source S2 on the basis of the equation (5):

$$F_x = \frac{\lambda_{Ry} \cdot \lambda_{Ry}}{4 \cdot \pi \cdot \rho} \left( \frac{-2}{b^2} + \frac{2 \cdot b}{\sqrt{a^2 + b^2}^3} \right) - \frac{\lambda_S \cdot \lambda_{Ry}}{4 \cdot \pi \cdot \rho \cdot a^2} \tag{68}$$

$$F_y = 0 \tag{69}$$

$$F_z = \frac{-\lambda_{Ry} \cdot \lambda_{Ry}}{4 \cdot \pi \cdot \rho \cdot a^2} \tag{70}$$

A sum of the forces applied at the point of sources S1 and S2 of the wing A can be written in the form:

$$F_x = -\frac{\lambda_{Ry} \cdot \lambda_{Ry}}{4 \cdot \pi \cdot \rho}\left(\frac{-2}{b^2} + \frac{2 \cdot b}{\sqrt{a^2 + b^2}^3}\right) - \frac{2 \cdot \lambda_S \cdot \lambda_{Ry}}{4 \cdot \pi \cdot \rho \cdot a^2} \quad (71)$$

$$F_y = 0 \quad (72)$$

$$F_x = \frac{\lambda_S \cdot \lambda_{Ry}}{4 \cdot \pi \cdot \rho}\left(\frac{-2}{b^2} + \frac{2 \cdot b}{\sqrt{a^2 + b^2}^3}\right) + \frac{\lambda_S \cdot \lambda_S}{4 \cdot \pi \cdot \rho \cdot a^2} - \frac{\lambda_{Ry} \cdot \lambda_{Ry}}{4 \cdot \pi \cdot \rho \cdot a^2} \quad (73)$$

It is for example possible to choose a condition a=b (the ground effect exists when the height of the aircraft is less than one third of the span, corresponding to h=(2·b)/4 and $$\lambda_S = \frac{\lambda_{Ry}}{5}$$

hypothetically). By defining $$K^2 = \left|\frac{\lambda_{Ry}^2}{4 \cdot \pi \cdot \rho b^2}\right|,$$

it is possible to summarize the different contributions of the forces using the following table:

|     | S3, S4 | S1' | S2' | S3', S4' |
|-----|--------|-----|-----|----------|
| $F_x$ | $F = K^2$ (=1) | $F = \frac{K^2}{5}$ (=0.2) | $F = \frac{K^2}{5}$ (=0.2) | $F = \frac{K^2}{(\sqrt{2})^3}$ (=0.35) |
| $F_y$ | e | Zero | zero | zero |
| $F_z$ | $F = \frac{K^2}{5}$ (=0.2) | $F = \frac{K^2}{25}$ (=0.04) | $F = K^2$ (=1) | $F = \frac{K^2}{5 \cdot (\sqrt{2})^3}$ (=0.07) |

The majority of the variations in the lift and drag force originate from the two rotational sources situated at the centre of the wing and of the image wing. The variation in the drag force is much greater than the variation in the lift when the aircraft approaches the ground. Close to the ground, one wing A appears experimentally to glide, as the drag force is the variable that reduces the most, essentially as a result of the reduction in the effect of the wingtip vortices of the wing A approaching the wingtip vortices of the mirror wing A'. In a method for the simulation of a force according to the invention, in a configuration of the wing A close to the ground, the contributions of the fluid flows FLU of the sources S' are also superposed during a step of simulation of the fluid FLU around the body C, and in a step of evaluation of a force and/or a moment, a linear function is evaluated, also as a function of at least one mirror mass flow rate $\lambda_S$ of at least one mirror vector mass flow rate $\lambda_R'$.

Figure 6:
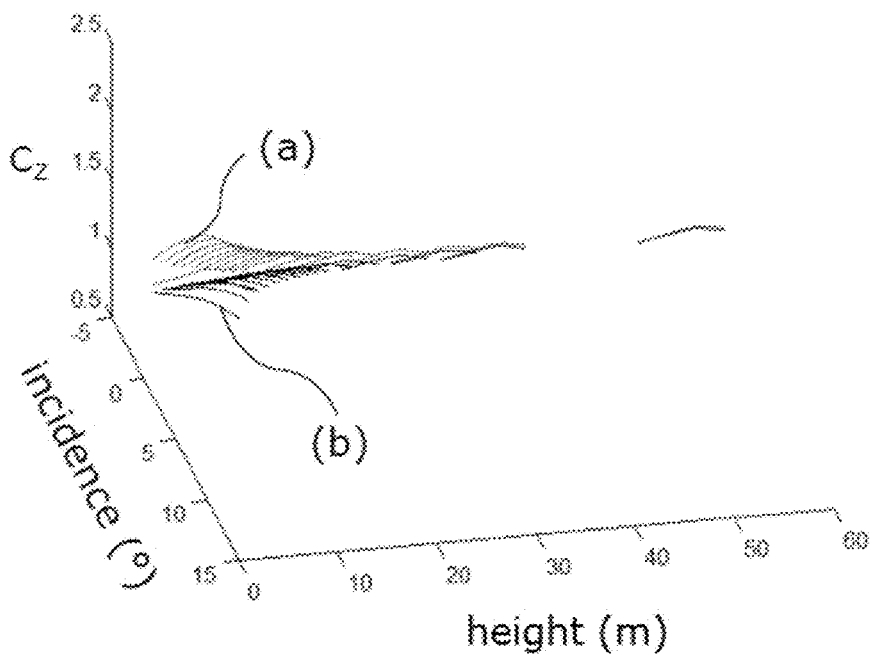
FIG. 6 shows a simulation of the lift coefficient according to the invention.

FIG. 6 shows a simulation of the lift coefficient according to the invention. The data from a simulator SIM contain the values of different aerodynamic parameters of the wing A, for example the values of Cx and Cz for different angles of incidence of the wing A (in data tables). Based on these data, the values of Cx and Cz can be amended as a function of the height of the aircraft with respect to the ground, and of the results of the evaluation of the aerodynamic parameters simulated according to the invention. The data thus evaluated are weighted, so as to be adjusted to a real behaviour of a wing A.

The diagram in FIG. 6 shows the drag force coefficients $C_z$ of a flight simulator according to the prior art (curves (b)) and the drag force coefficients $C_z$ evaluated according to the invention (curves (a)), using a model comprising mirror external sources, described above. The $C_z$ values are shown as a function of altitude, for altitude or height of the wing A and its angle of incidence.

Figure 7:
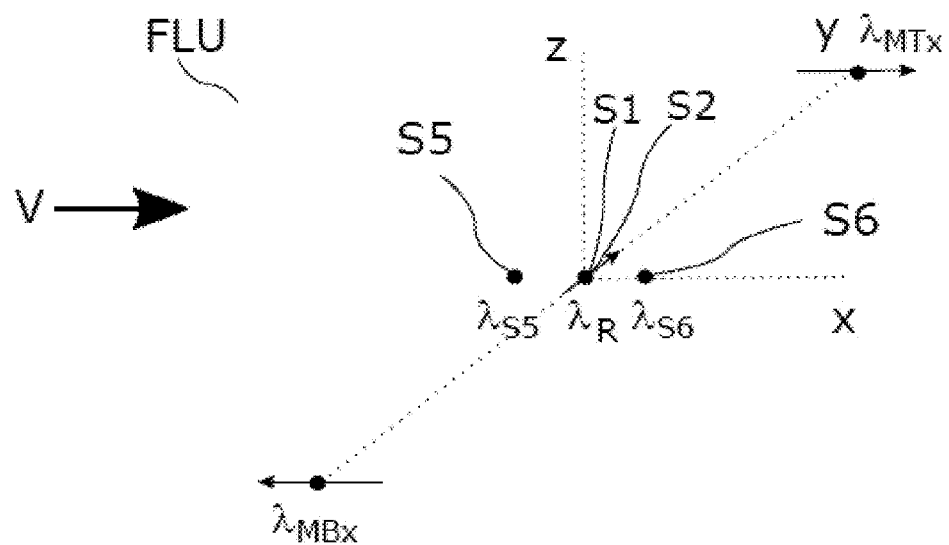
FIG. 7 shows a model construction according to the invention making it possible to simulate the Magnus effect and a shape drag force.

FIG. 7 shows the construction of a model according to the invention making it possible to simulate the Magnus effect and a shape drag force.

Theoretically and generally, considering a cylinder in rotation, with an angular velocity $\omega_{cy1}$, of infinite length, the cylinder being considered according to its circular cross section, Poisson equations make it possible to derive the potential of the velocities in polar coordinates:

$$\phi(r, \theta) = \frac{\cos(\theta)}{2}\left(r + \frac{1}{r}\right) - \frac{r}{2\pi}\theta. \quad (74)$$

The streamlines can be described by:

$$\psi(r, \theta) = \frac{\sin(\theta)}{2}\left(r - \frac{1}{r}\right) + \frac{r}{2\pi}\ln(r), \quad (75)$$

and the radial and angular velocities, respectively by:

$$v_r = \frac{\partial \phi}{\partial r} = \frac{\cos(\theta)}{2}\left(1 - \frac{1}{r^2}\right) \quad (76)$$

$$v_\theta = \frac{1}{r}\frac{\partial \phi}{\partial \theta} = -\frac{\sin(\theta)}{2}\left(1 + \frac{1}{r^2}\right) - \frac{r}{2\pi \cdot r}. \quad (77)$$

In this case the lift force is:

$$F_p = -\rho v_0 \Gamma \quad (78)$$

In this theoretical framework, it is possible to express a lift force, but not a drag force. Outside this theoretical framework, as the cylinder is infinite, there is no induced drag force. There is however a shape drag force and a friction drag force.

In an embodiment of the invention, a model is constructed in which two sources S are arranged so as to form a dipole. In embodiments of the invention, this dipole can be oriented, as shown in FIG. 7, in the direction of the main velocity vector V. Two sources S arranged in this manner are shown in FIG. 7 by the sources S5 and S6. These two sources are respectively associated with the scalar mass flow rates $\lambda_{S5}$ and $\lambda_{S6}$, and placed on either side of the point corresponding to the sources S1 and S2, and along an axis of the same direction as the main velocity vector V. The two sources S forming the dipoles can be associated with scalar mass flow rates $\lambda_S$ that are different and have opposite signs.

In variants of the invention, the scalar mass flow rates $\lambda_{S5}$ and $\lambda_{S6}$ associated with the sources S5 and S6 can be equal or different.

In a variant of the invention, when the mass flow rates $\lambda_{S5}$ and $\lambda_{S6}$ are different, a supplementary condition is necessary in order to make it possible to solve the systems of equations allowing the different scalar and/or vector mass flow rates associated with the sources S to be calculated. A condition corresponding to a zero normal flow velocity at a point of the interface of a virtual wing A or a virtual body C can be added to the modelling.

FIG. 7 shows the construction of a model comprising a dipole of scalar sources S. According to the equations (1) and (2) it is possible to derive:

$$\lambda_R V_\infty = \frac{1}{2}\rho V_\infty^2 C_Z S \quad (79)$$

$$\lambda_S V_\infty = \frac{1}{2}\rho V_\infty^2 C_X S \quad (80)$$

i.e.:

$$\begin{cases} V_\infty C_Z = \dfrac{1}{\frac{1}{2}\rho \cdot S} \cdot \lambda_R \\ V_\infty C_X = \dfrac{1}{\frac{1}{2}\rho \cdot S} \cdot \lambda_S \end{cases} \quad (81), (82)$$

A intercoupling matrix can be identified by deriving the following equation:

$$\begin{pmatrix} V_\infty C_Z \\ V_\infty C_X \end{pmatrix} = \frac{1}{\frac{1}{2}\rho \cdot S} \begin{pmatrix} 1 & 0 \\ 0 & 1 \end{pmatrix} \cdot \begin{pmatrix} \lambda_R \\ \lambda_S \end{pmatrix} = \begin{pmatrix} \dfrac{1}{\frac{1}{2}\rho \cdot S} & 0 \\ 0 & \dfrac{1}{\frac{1}{2}\rho \cdot S} \end{pmatrix} \cdot \begin{pmatrix} \lambda_R \\ \lambda_S \end{pmatrix} \quad (83)$$

Figure 8:
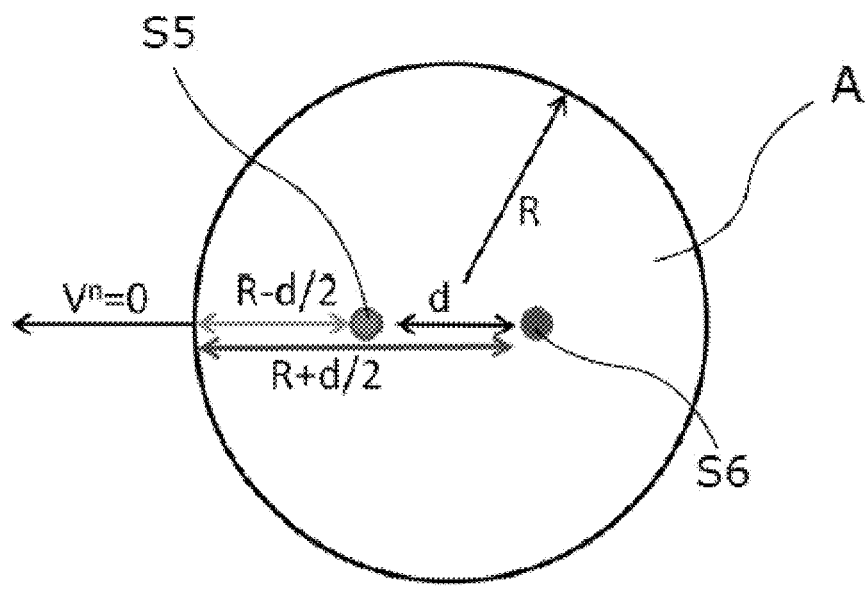
FIG. 8 shows a cross section of an infinite cylinder, corresponding to a body or to a wing.

FIG. 8 shows a circular cross section of an infinite cylinder, corresponding to a body C or to a wing A. Two scalar sources S5 and S6 are arranged in the same way as shown in FIG. 7. The two sources are separated by a distance d and the cylinder has a radius R. It is possible to derive an equation corresponding to a zero normal velocity condition at the interface of a body C or of a wing A.

$$V^n = 0 = \frac{\left(R - \frac{d}{2}\right) \cdot \lambda_{S1}}{4 \cdot \pi \cdot \rho \cdot \left(R - \frac{d}{2}\right)^3} + \frac{\left(R + \frac{d}{2}\right) \cdot \lambda_{S2}}{4 \cdot \pi \cdot \rho \cdot \left(R + \frac{d}{2}\right)^3} = \frac{\lambda_{S1}}{4 \cdot \pi \cdot \rho \cdot \left(R - \frac{d}{2}\right)^2} + \frac{\lambda_{S2}}{4 \cdot \pi \cdot \rho \cdot \left(R + \frac{d}{2}\right)^2} \quad (84)$$

A intercoupling matrix can be identified in the following equation:

$$\begin{pmatrix} 0 \\ V_\infty C_x \\ V_\infty C_z \end{pmatrix} = \begin{pmatrix} \dfrac{1}{\frac{1}{2}\rho \cdot S} & 0 & 0 \\ 0 & \dfrac{1}{\frac{1}{2}\rho \cdot S} & \dfrac{1}{\frac{1}{2}\rho \cdot S} \\ \dfrac{1}{4 \cdot \pi \cdot \rho \cdot R^2\left(1 - \frac{d}{2R}\right)^2} & \dfrac{1}{4 \cdot \pi \cdot \rho \cdot R^2\left(1 + \frac{d}{2R}\right)^2} & 0 \end{pmatrix} \cdot \begin{pmatrix} \lambda_R \\ \lambda_{S1} \\ \lambda_{S2} \end{pmatrix} = \quad (85)$$

$$\begin{pmatrix} \left|\dfrac{1}{\frac{1}{2}\rho \cdot S}\right| & 1 & 0 & 0 \\ \left|\dfrac{1}{\frac{1}{2}\rho \cdot S}\right| & 0 & 1 & 1 \\ \left|\dfrac{1}{4 \cdot \pi \cdot \rho \cdot R^2}\right| & \left(1 - \dfrac{d}{2R}\right)^{-2} & \left(1 + \dfrac{d}{2R}\right)^{-2} & 0 \end{pmatrix} \cdot \begin{pmatrix} \lambda_R \\ \lambda_{S1} \\ \lambda_{S2} \end{pmatrix}$$

Figure 9:
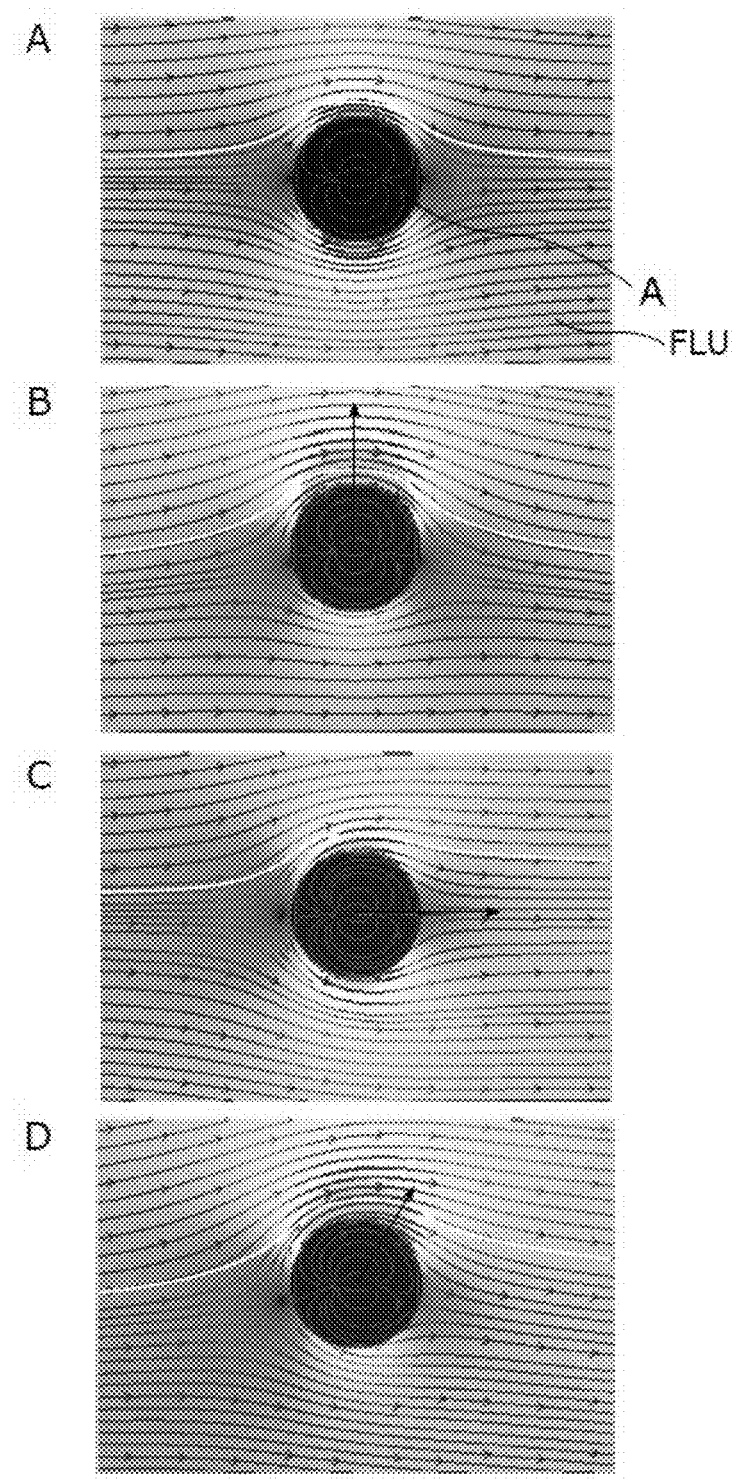
FIG. 9 shows a simulation of a fluid flow around a wing A, the shape of which is an infinite cylinder simulated by a model according to the invention in which two scalar sources are arranged as a dipole.

FIG. 9 shows a simulation of a fluid flow FLU around a wing A, the shape of which is an infinite cylinder simulated by a model according to the invention in which two scalar sources S5 and S6 are arranged as a dipole. The scalar sources S5 and S6 are arranged as described in the embodiments of the invention corresponding to FIGS. 6 and 7. The different grey levels show the value of the fluid velocity FLU (the black corresponding to zero velocity and the white corresponding to maximum velocity). The black lines comprising multiple arrows correspond to streamlines. The single black arrows, in panels B. C and D in FIG. 9 correspond to the resultant of the forces calculated by a model constructed according to the invention and simulated according to the invention.

The panel A in FIG. 9 shows a simulation according to the invention, using a model constructed according to the invention, comprising sources S1, S5 and S6 described above, associated respectively with the scalar $\lambda_{S5}$, $\lambda_{S6}$ and vector $\lambda_{Ry}$ mass flow rates. In this case, $\lambda_{Ry}=0$ and $\lambda_{S5}=\lambda_{S6}$. The resultant cylinder of the simulation is fixed and without drag force. In this case, the lift and the drag force are zero: this case corresponding to d'Alembert's paradox.

The panel B in FIG. 9 shows a simulation according to the invention, using a model constructed according to the invention, comprising sources S1, S5 and S6 described above, associated respectively with the scalar $\lambda_{S5}$, $\lambda_{S6}$ and vector $\lambda_{Ry}$ mass flow rates. In this case, $\lambda_{Ry}\neq 0$ and $\lambda_{S5}=\lambda_{S6}$. The resultant cylinder of the simulation is rotational about its main axis, without drag force. In this case, the lift is non-zero and the drag force is zero: this case corresponds to the Magnus effect.

The panel C in FIG. 9 shows a simulation according to the invention, using a model constructed according to the invention, comprising sources S1, S5 and S6 described above, associated respectively with the scalar $\lambda_{S5}$, $\lambda_{S6}$ and vector $\lambda_{Ry}$ mass flow rates. In this case, $\lambda_{Ry}=0$ and $\lambda_{S5}\neq\lambda_{S6}$. The resultant cylinder of the simulation is fixed and involves drag force. In this case, the lift is zero and the drag force is non-zero: this case corresponds to a shape drag force.

The panel D in FIG. 9 shows a simulation according to the invention, using a model constructed according to the invention, comprising sources S1, S5 and S6 described above, associated respectively with the scalar $\lambda_{S5}$, $\lambda_{S6}$ and vector $\lambda_{Ry}$ mass flow rates. In this case. $\lambda_{Ry}\neq 0$ and $\lambda_{S5}\neq\lambda_{S6}$. The resultant cylinder of the simulation is rotational about its main axis, and involves a drag force. In this case, the lift is zero and the drag force is non-zero: this case approaches a real case.

Figure 10:
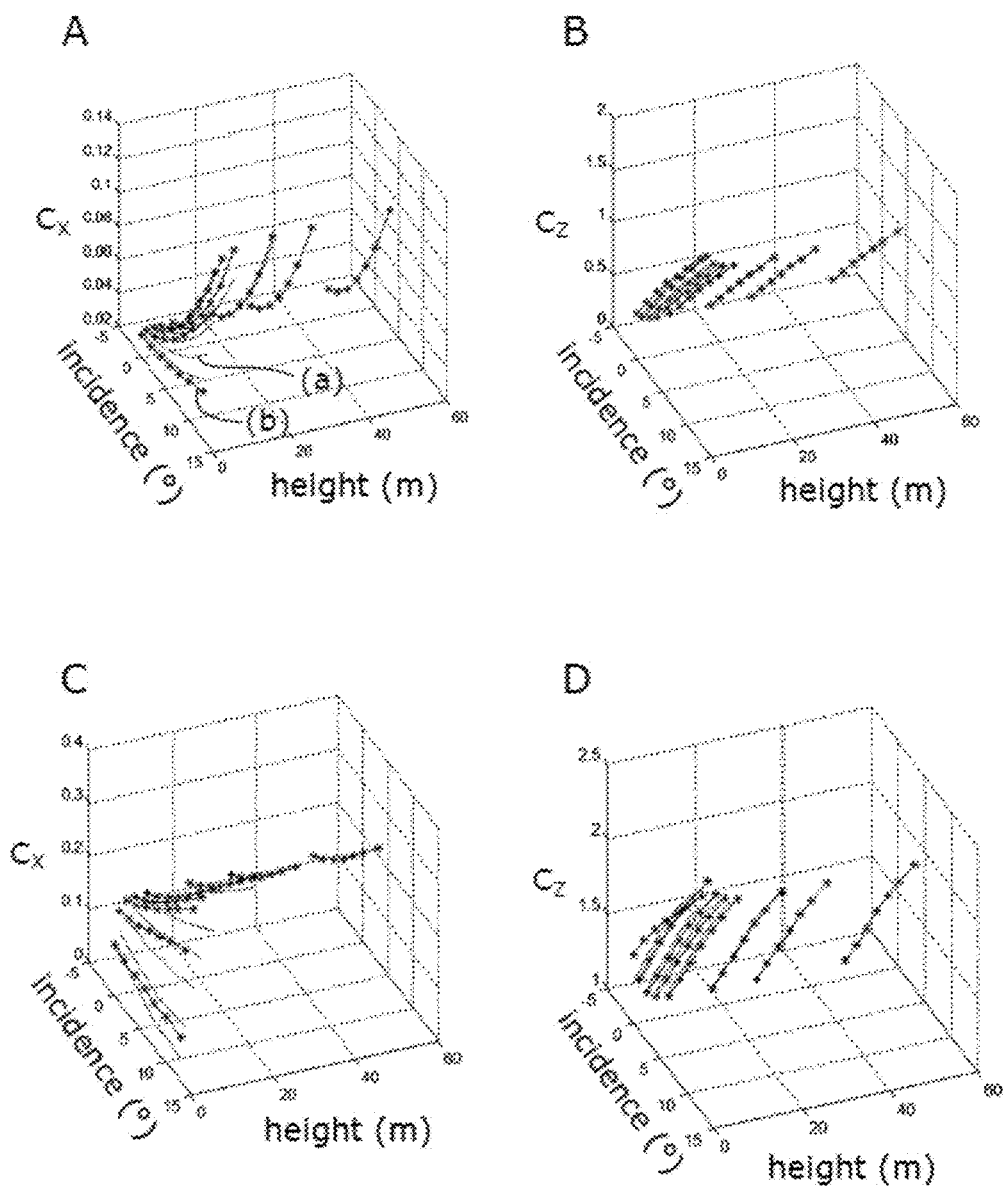
FIG. 10 shows drag force coefficients and lift coefficients evaluated comparatively according to a method of the prior art and according to the invention.
Figure 11:
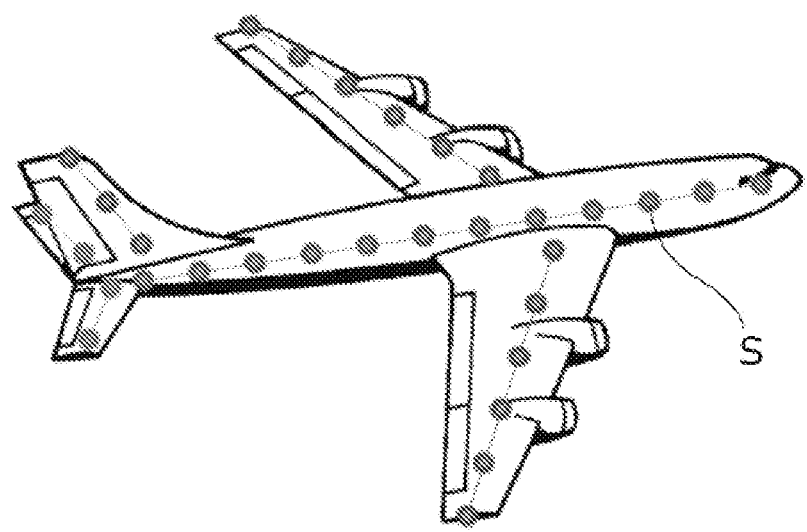
FIG. 11 shows a wing A and an arrangement of sources S according to the invention.

FIG. 10 shows drag force coefficients and lift coefficients comparatively evaluated according to a method of the prior art and according to the invention.

The panel A in FIG. 10 shows on the one hand, drag force coefficients $C_X$ evaluated according to a method implemented by a flight simulator, according to a method of the prior art using nomograph pointers. These values of the drag force coefficients $C_X$ are shown by the continuous curves, for example the curve (a). Moreover, the panel A in FIG. 10 shows drag force coefficients $C_X$ evaluated according to the invention, and corresponding to the curves marked with stars, for example the curve (b). The $C_X$ evaluations according to the invention are obtained by weighting the scalar mass flow rates by a factor 0.25 and weighting the vector mass flow rates by a factor 0.1 so as to adjust the evaluations to the real behaviour of a wing A. The flaps of the wing A are inclined by 8° with respect to a main plane of the wing A.

The panel B in FIG. 10 shows on the one hand, drag force coefficients $C_z$ evaluated according to a method implemented by a flight simulator, according to a method of the prior art using nomograph pointers. These values of the drag force coefficients $C_z$ are shown by the continuous curves, for example the curve (a). Moreover, the panel B in FIG. 10 shows drag force coefficients $C_z$ evaluated according to the invention, and corresponding to the curves marked with stars, for example the curve (b). The evaluations of the $C_Z$ according to the invention are obtained by weighting the scalar mass flow rates by a factor 0.25 and weighting the vector mass flow rates by a factor 0.1 so as to adjust the evaluations to the real behaviour of a wing A. The flaps of the wing A are inclined by 8° with respect to a main plane of the wing A.

The panel C in FIG. 10 shows on the one hand, drag force coefficients $C_X$ evaluated according to a method implemented by a flight simulator, according to a method of the prior art using nomograph pointers. These values of the drag force coefficients $C_X$ are shown by the continuous curves, for example the curve (a). Moreover, the panel C in FIG. 10 shows drag force coefficients $C_X$ evaluated according to the invention, and corresponding to the curves marked with stars, for example the curve (b). The $C_X$ evaluations according to the invention are obtained by weighting the scalar mass flow rates by a factor 0.75 and weighting the vector mass flow rates by a factor 0.1 so as to adjust the evaluations to the real behaviour of a wing A. The flaps of the wing A are inclined by 42° with respect to a main plane of the wing A.

The panel D in FIG. 10 shows on the one hand, drag force coefficients C, evaluated according to a method implemented by a flight simulator, according to a method of the prior art using nomograph pointers. These values of the drag force coefficients $C_z$ are shown by the continuous curves, for example the curve (a). Moreover, the panel D in FIG. 10 shows drag force coefficients $C_z$ evaluated according to the invention, and corresponding to the curves marked with stars, for example the curve (b). The evaluations of the $C_Z$ according to the invention are obtained by weighting the scalar mass flow rates by a factor 0.75 and weighting the vector mass flow rates by a factor 0.1 so as to adjust the evaluations to the real behaviour of a wing A. The flaps of the wing A are inclined by 42° with respect to a main plane of the wing A.

FIG. 1 shows a wing A and an arrangement of sources S according to the invention. In variants of a method for the construction of a model according to the invention, advantageously fewer than one hundred sources S are arranged, preferentially fewer than ten sources S. In this way, it is possible to reduce the calculation time, by a simulator SIM implementing a simulation method according to the invention, to a period less than 6 ms.

Figure 12:
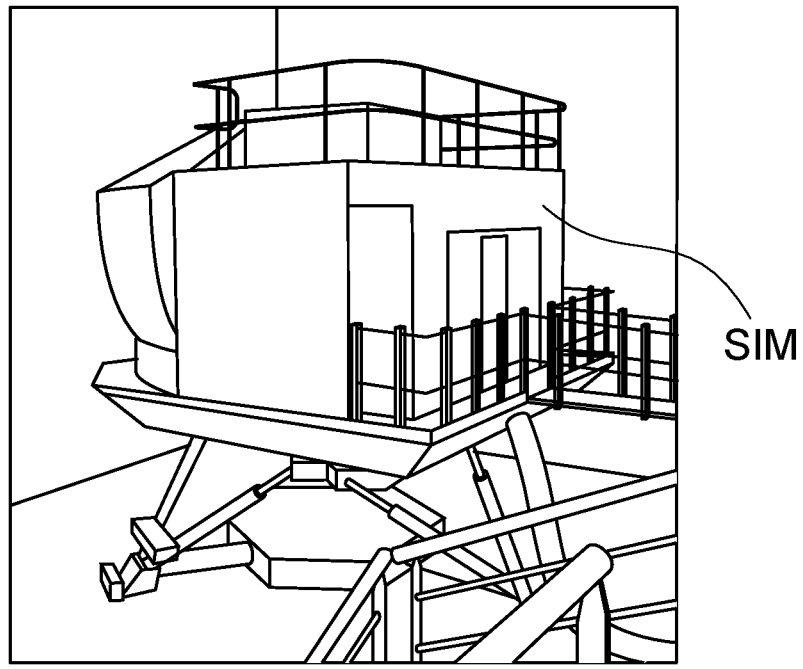
FIG. 12 is a photograph of a simulator SIM according to the invention.

FIG. 12 is a photograph of a simulator SIM according to the invention.

The invention claimed is:

1. A method implemented by a computer for real-time simulation of at least one element chosen from a force and a moment, applied to a body defined by a volume in a fluid flow having a main velocity vector representing the velocity of said flow at infinity, in which said body is modelled beforehand by at least two point sources of a velocity field, including at least one scalar source, generating a radial velocity field and associated with a scalar mass flow rate $\lambda_S$, and at least one vector source—, generating a solenoidal velocity field, associated with a vector mass flow rate $\lambda_R$, said sources being arranged at barycentre inside said volume, said method comprising the steps of:
    (a) simulating a superposition of the contributions of the fluid flows at least of one main velocity flow, of one said scalar source associated with a scalar mass flow rate $\lambda_S$ and of one said vector source associated with a vector mass flow rate $\lambda_R$; and
    (b) evaluating at least one element chosen from a force and a moment, by a linear function dependent on said main velocity vector, of at least one said scalar mass flow rate $\lambda_S$ and of at least one said vector mass flow rate $\lambda_R$, at least one point corresponding to one said source, said body being a wing.

2. The method according to claim 1, in which said simulation is a far-field simulation.

3. The method according to claim 2, in which said body is modelled by fewer than one hundred of said sources.

4. The method according to claim 1, in which two of said scalar sources are arranged so as to form a dipole.

5. The method according to claim 4, in which the scalar mass flow rates $\lambda_S$ associated with the two said sources forming said dipole are strictly different and have opposite signs.

6. The method according to claim 1, in which at least two contrarotating vector sources are arranged inside a volume defining said body, associated vector mass flow rates $\lambda_R$ of which have opposite directions.

7. The method according to claim 6, in which said vector mass flow rates are oriented parallel to said direction of a main velocity vector, the two said contrarotating vector sources forming a direction normal to the direction of said main velocity vector.

8. The method according to claim 7, in which the sources are arranged along a line corresponding to a simple wing.

9. The method according to claim 1, in which one element representative of the environment of the body is modelled beforehand by at least one element chosen from a scalar external source associated with an external scalar mass flow rate $\lambda_S'$ and from one vector external source associated with an external vector mass flow rate $\lambda_R'$, and in which:
    the contributions of the fluid flows of each of said sources are also superposed during said step (a); and
    in said step (b) said analytic linear function is evaluated also as a function of at least one said external mass flow rate $\lambda_S'$ and at least one external vector mass flow rate $\lambda_R'$.

10. The method according to claim 9, in which:
    said body is close to the ground, said ground coinciding locally with a plane, said sources being arranged beforehand in a first half-space a limit of which is formed by said plane, the first half-space being above the ground; and
    at least one mirror scalar external source associated with a mirror external scalar mass flow rate and at least one said mirror vector external source associated with a mirror external vector mass flow rate are arranged in the other half-space a limit of which is formed by said plane, the other half-space being below the ground plane, and in which:

the contributions of the fluid flows of said mirror scalar external source and mirror vector external source are also superposed during said step (a); and in said step (b) said analytic linear function is evaluated also as a function of at least one said mirror external mass flow rate and of at least one said mirror external vector mass flow rate.

11. A computer program product stored on a non-transitory recording medium suitable for implementing a method according to claim 1.

12. A non-transitory recording medium on which the program according to claim 11 is stored.

13. A flight simulator comprising: at least one calculator configured in order to receive at least first data acquired by a user, a memory containing second data representative of the fluid flow around said body, and in that said calculator is configured in order to implement a method according to claim 1.

14. A method for the construction of a body model in a fluid flow having at least one main velocity vector representing the velocity at infinity, said body being associated with at least two aerodynamic parameters chosen from a drag force coefficient, a lift coefficient, a roll coefficient, a pitch coefficient and a yaw coefficient, each coefficient being determined in one or more known spatial coefficients of said body, in said fluid flow, said method comprising at least the steps consisting of:

(a) arranging in the simulated space at least two point sources of fluid, including at least one scalar source of fluid, associated with an unknown scalar mass flow rate $\lambda_S$, and at least one vector source of fluid, associated with an unknown vector mass flow rate $\lambda_R$, said sources being arranged inside said volume defined by said body;

(b) determining the value of each said scalar mass flow rate $\lambda_S$ and each said vector mass flow rate $\lambda_R$ as a function of a part of the boundary conditions imposed by said at least one main velocity vector and as a linear function of said at least one main velocity vector, said body being a wing.

15. The method according to claim 14 in which in said step (b), the value of each said scalar mass flow rate $\lambda_S$ and each said vector mass flow rate $\lambda_R$ is determined by the distributed point source method.

* * * * *